United States Patent
Hamilton, II et al.

(10) Patent No.: US 8,972,870 B2
(45) Date of Patent: Mar. 3, 2015

(54) PROVIDING ALTERNATIVE REPRESENTATIONS OF VIRTUAL CONTENT IN A VIRTUAL UNIVERSE

(75) Inventors: Rick A. Hamilton, II, Richmond, VA (US); Brian M. O'Connell, Research Triangle Park, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 12/548,463

(22) Filed: Aug. 27, 2009

(65) Prior Publication Data

US 2011/0055726 A1 Mar. 3, 2011

(51) Int. Cl.
G06F 3/00 (2006.01)
G06F 3/0481 (2013.01)

(52) U.S. Cl.
CPC .................................. *G06F 3/04815* (2013.01)
USPC ........................................... 715/757; 715/706

(58) Field of Classification Search
CPC ................................ G06F 3/0481; A63F 13/12
USPC .................................. 715/706, 757; 345/419
See application file for complete search history.

(56) References Cited

U.S. PATENT DOCUMENTS

| | | | |
|---|---|---|---|
| 5,754,222 A * | 5/1998 | Daly et al. ..................... | 348/184 |
| 6,329,986 B1 * | 12/2001 | Cheng ........................... | 345/419 |
| 6,560,717 B1 | 5/2003 | Scott et al. | |
| 6,705,945 B2 | 3/2004 | Gavin et al. | |
| 7,155,723 B2 * | 12/2006 | Swildens et al. .............. | 718/105 |
| 7,293,235 B1 * | 11/2007 | Powers et al. .................. | 715/706 |
| 7,346,676 B1 * | 3/2008 | Swildens et al. .............. | 709/223 |
| 7,383,331 B2 | 6/2008 | Takahashi et al. | |
| 7,415,529 B2 | 8/2008 | Saunders et al. | |
| 7,703,102 B1 | 4/2010 | Eppstein et al. | |
| 8,126,985 B1 * | 2/2012 | Kandekar et al. ............. | 709/217 |
| 2002/0142843 A1 | 10/2002 | Roelofs | |
| 2003/0131092 A1 | 7/2003 | McGee et al. | |
| 2003/0231610 A1 | 12/2003 | Haddad | |
| 2004/0078657 A1 | 4/2004 | Gross et al. | |
| 2004/0090450 A1 | 5/2004 | Gill et al. | |
| 2004/0215768 A1 | 10/2004 | Oulu et al. | |
| 2004/0233222 A1 * | 11/2004 | Lee et al. ...................... | 345/621 |
| 2005/0228856 A1 | 10/2005 | Swildens et al. | |

(Continued)

OTHER PUBLICATIONS

Chen et al , A dynamic load balancing model for the multi-server online game systems, 2004, pp. 1-2.*

(Continued)

*Primary Examiner* — Ryan Pitaro
(74) *Attorney, Agent, or Firm* — William E. Schiesser; Darrell L. Pogue; Keohane & D'Alessandro PLLC

(57) ABSTRACT

An invention for automatically reducing a load on a server functioning with a virtual universe is provided. In one embodiment, there is an alternative representation tool, including a detection component configured to detect a load on a server, and a determination component configured to determine whether the load on the server exceeds a predefined threshold. The alternative representation tool further comprises a rendering component configured to provide an alternative representation of a virtual content renderable in the virtual universe to reduce the load on the server in the case that the load on the server exceeds the predefined threshold.

19 Claims, 8 Drawing Sheets

(56) References Cited

U.S. PATENT DOCUMENTS

| | | |
|---|---|---|
| 2006/0053113 A1* | 3/2006 | Hentschel ................. 707/10 |
| 2006/0080409 A1 | 4/2006 | Bieber |
| 2006/0190284 A1* | 8/2006 | Jung et al. ................. 705/1 |
| 2006/0190484 A1 | 8/2006 | Cromer et al. |
| 2007/0011498 A1 | 1/2007 | Shaffer et al. |
| 2007/0033366 A1* | 2/2007 | Eisenhauer et al. .......... 711/170 |
| 2007/0143119 A1 | 6/2007 | Jung et al. |
| 2007/0204047 A1* | 8/2007 | Parker et al. ................. 709/227 |
| 2008/0061960 A1 | 3/2008 | Tamura |
| 2008/0163064 A1* | 7/2008 | Swildens et al. ............. 715/736 |
| 2008/0165199 A1* | 7/2008 | Wei et al. ................. 345/506 |
| 2008/0186862 A1 | 8/2008 | Corbett et al. |
| 2008/0195745 A1 | 8/2008 | Bowra et al. |
| 2008/0195755 A1 | 8/2008 | Lu et al. |
| 2008/0195955 A1 | 8/2008 | Salesky et al. |
| 2009/0031038 A1* | 1/2009 | Shukla et al. ................. 709/231 |
| 2009/0113448 A1* | 4/2009 | Smith et al. ................. 719/314 |
| 2009/0118022 A1* | 5/2009 | Lyons et al. ................. 463/42 |
| 2009/0172773 A1* | 7/2009 | Moore ................. 726/1 |
| 2009/0198824 A1* | 8/2009 | Taylor ................. 709/230 |
| 2009/0225076 A1* | 9/2009 | Vlietinck ................. 345/419 |
| 2009/0253109 A1* | 10/2009 | Anvari et al. ................. 434/262 |
| 2010/0093438 A1* | 4/2010 | Baszucki et al. ................. 463/42 |
| 2010/0125649 A1* | 5/2010 | Day et al. ................. 709/219 |
| 2010/0169799 A1* | 7/2010 | Hyndman et al. ............. 715/757 |
| 2010/0312995 A1* | 12/2010 | Sung ................. 712/220 |
| 2011/0256935 A1* | 10/2011 | Douglas et al. ................. 463/42 |

OTHER PUBLICATIONS

U.S. Appl. No. 12/212,399, Office Action, Sep. 21, 2010, 37 pages.
Chen et al., "A dynamic load balancing model for the multi-server online game systems", 2004.
Lees, "The Five Stages of Server Shutdown", Jul. 2, 2006.
Wu et al., "A Model for Massively Multiplayer Role-playing Games System Performance", 2006.
Assiotis et al., "A Distributed Architecture for MMORPG", 2006.
Ahmed et al., "A Microcell Oriented Load Balancing Model for Collaborative Virtual Environments", 2008.
U.S. Appl. No. 12/212,399, Office Action, Feb. 7, 2011, 9 pages.
U.S. Appl. No. 12/212,399, Notice of Allowance, May 27, 2011, 6 pages.

* cited by examiner

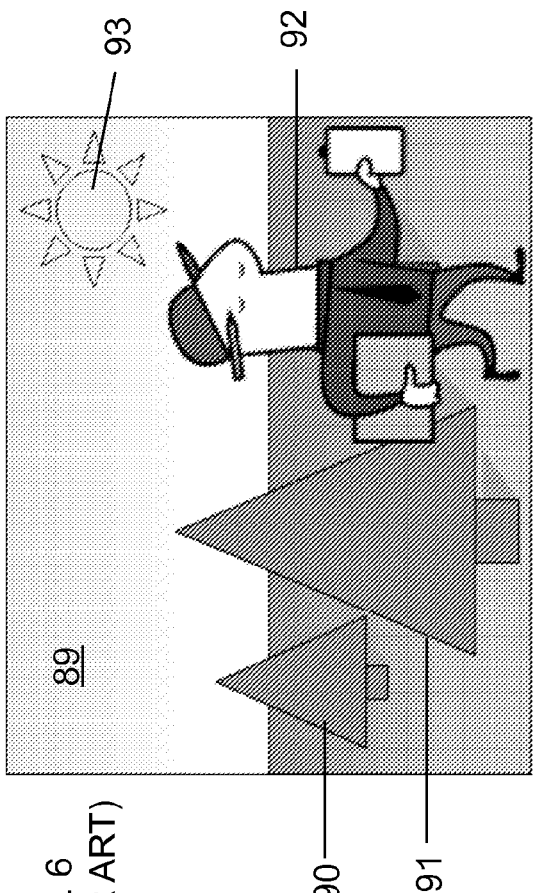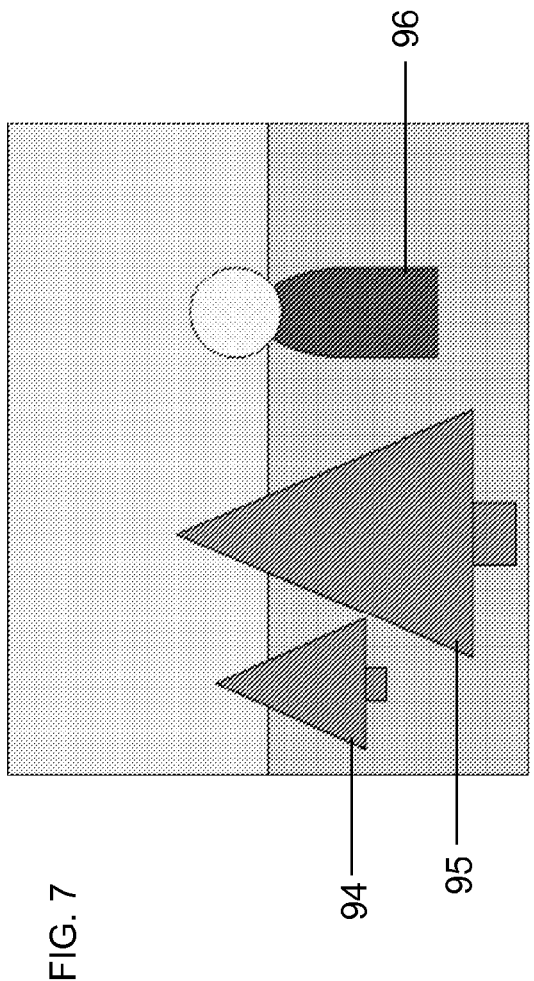
FIG. 6 (PRIOR ART)
FIG. 7

PROVIDING ALTERNATIVE REPRESENTATIONS OF VIRTUAL CONTENT IN A VIRTUAL UNIVERSE

CROSS-REFERENCE TO COPENDING APPLICATION

Commonly owned U.S. patent application Ser. No. 12/212,399, entitled "System and Method for Managing Server Performance Degradation in a Virtual Universe", filed on Sep. 17, 2008, contains subject matter related, in certain aspects, to the subject matter of the present application.

FIELD OF THE INVENTION

This invention relates generally to virtual universes and more specifically to the rendering of alternative representations of virtual content in a virtual universe.

BACKGROUND OF THE INVENTION

Virtual universes (VUs) or virtual worlds are computer-based simulated environments intended for its users or residents to inhabit and interact via avatars, which are personas or representations of the users of the virtual universes. These types of virtual universes are now most common in multiplayer online games, such as Second Life®, which is a trademark of Linden Research Inc. in the United States. Avatars in these types of virtual universes, which can number well over a million, have a wide range of business and social experiences.

It is possible for these VUs to be quite complex, with each VU or region within the VU having a large number of avatars, objects, texts and scripts for desired visual and functional effects. As more avatars enter a region of land, the VU server has to expend additional central processing unit (CPU) cycles and memory, which creates higher server load. For each avatar, server CPU resources are required to transmit geometric information, avatar movements, textural information, as well as streaming audio and video for the servers' regions. However, if CPU resources required for all avatars exceeds the available CPU resources on a server, an overload condition may be present causing performance degradation for users of the VU.

SUMMARY OF THE INVENTION

In one embodiment, there is a method for automatically reducing a load on a server functioning with a virtual universe comprising: detecting a load on a server; determining whether the load on the server exceeds a predefined threshold; and providing an alternative representation of a virtual content renderable in the virtual universe to reduce the load on the server in the case that the load on the server exceeds the predefined threshold.

In a second embodiment, there is a computer system for automatically reducing a load on a server functioning with a virtual universe. In this embodiment, the computer system comprises at least one processing unit and memory operably associated with the at least one processing unit. An alternative representation tool is storable in memory and executable by the at least one processing unit. The alternative representation tool comprises: a detection component configured to detect a load on a server; a determination component configured to determine whether the load on the server exceeds a predefined threshold; and a rendering component configured to provide an alternative representation of a virtual content in renderable in the virtual universe to reduce the load on the server in the case that the load on the server exceeds the predefined threshold.

In a third embodiment, there is a computer-readable medium storing computer instructions, which when executed, enables a computer system to automatically reduce a load on a server functioning with a virtual universe. In this embodiment, the computer instructions comprise: detect a load on a server; determine whether the load on the server exceeds a predefined threshold; and provide an alternative representation of a virtual content renderable in the virtual universe to reduce the load on the server in the case that the load on the server exceeds the predefined threshold.

In a fourth embodiment, there is a method for deploying an alternative representation tool for use in a computer system that automatically reduces a load on a server functioning with a virtual universe. In this embodiment, a computer infrastructure is provided and is operable to: detect a load on a server; determine whether the load on the server exceeds a predefined threshold; and provide an alternative representation of a virtual content renderable in the virtual universe to reduce the load on the server in the case that the load on the server exceeds the predefined threshold.

BRIEF DESCRIPTION OF THE DRAWINGS

FIG. 6 shows a more detailed view of virtual content rendered in a prior art virtual universe;

FIG. 7 shows a more detailed view of an exemplary alternative representation of the virtual content shown in FIG. 6;

Figure 1:
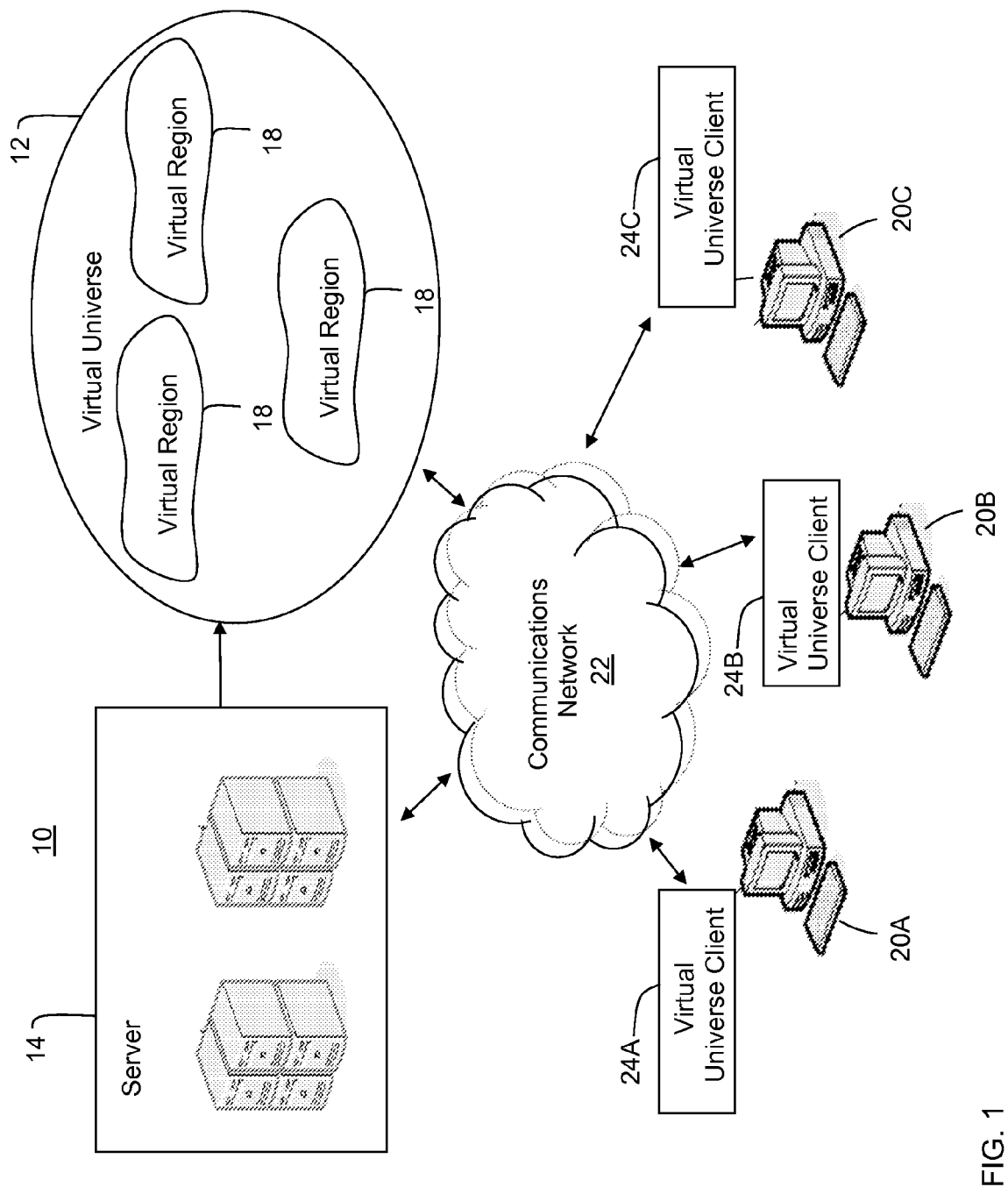
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to providing alternative representations of virtual content in a virtual universe to reduce the load (i.e., the amount of computing/processing work) on one or more servers operating with the virtual universe. In these embodiments, an alternative representation tool provides the capability to provide an alternative representation of virtual content in a virtual universe. The alternative representation tool comprises a detection component configured to detect a load on the server. A determination component is configured to determine whether the load on the server exceeds a predefined threshold. The alternative representation tool further comprises a rendering component configured to provide an alternative representation of a virtual content renderable in the virtual universe to reduce the load on the server in the case that the load on the server exceeds the predefined threshold. By rendering the alternative representation (i.e., modified or simplified) virtual content in the virtual universe, a potential overload condition can be mitigated.

FIG. 1 shows a high-level schematic diagram showing a networking environment 10 for providing a virtual universe (VU) 12 according to one embodiment of this invention in which a service for providing an alternative representation of virtual content in a virtual universe can be utilized. As shown in FIG. 1, networking environment 10 comprises a server 14, which may be an array or grid of multiple servers each responsible for managing a portion of virtual real estate within VU 12. A virtual universe provided by a multiplayer online game, for example, can employ thousands of servers to manage all of the virtual real estate. The virtual content of VU 12 is comprised of a number of objects, each having associated texts/scripts, defined in a programming language readable by VU 12. The virtual content is managed by server 14 and may show up in VU 12 as one or more virtual regions 18. Like the real-world, each virtual region 18 within VU 12 comprises a landscape having virtual content, such as buildings, stores, clubs, sporting arenas, parks, beaches, cities and towns all created by administrators or residents of the virtual universe that are represented by avatars. These examples of virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred generally as 20) interact with VU 12 through a communications network 22 via virtual universe clients 24A-24C (hereinafter referred generally as 24) that reside in computers 20, respectively. Below are further details of VU 12, server 14, and virtual universe client 24.

One of the ways that users or administrators can interact with the virtual universe is to create virtual content for the virtual universe. An illustrative but non-limiting listing of virtual content that can be created includes items such as apparel for avatars, animations for a multitude of purposes (e.g., advertisements, instructional material, etc.), avatar accessories (e.g., jewelry, hairpieces, clothing, etc.), scripts for performing certain functions in the virtual universes, building components, avatar appearance features, recreational equipment (e.g., bicycles), automobiles, etc. As will be further described herein, embodiments of this invention are directed to providing an alternative representation of these types of virtual content renderable in the virtual universe to automatically reduce the load on server 14 functioning with VU 12.

Figure 2:
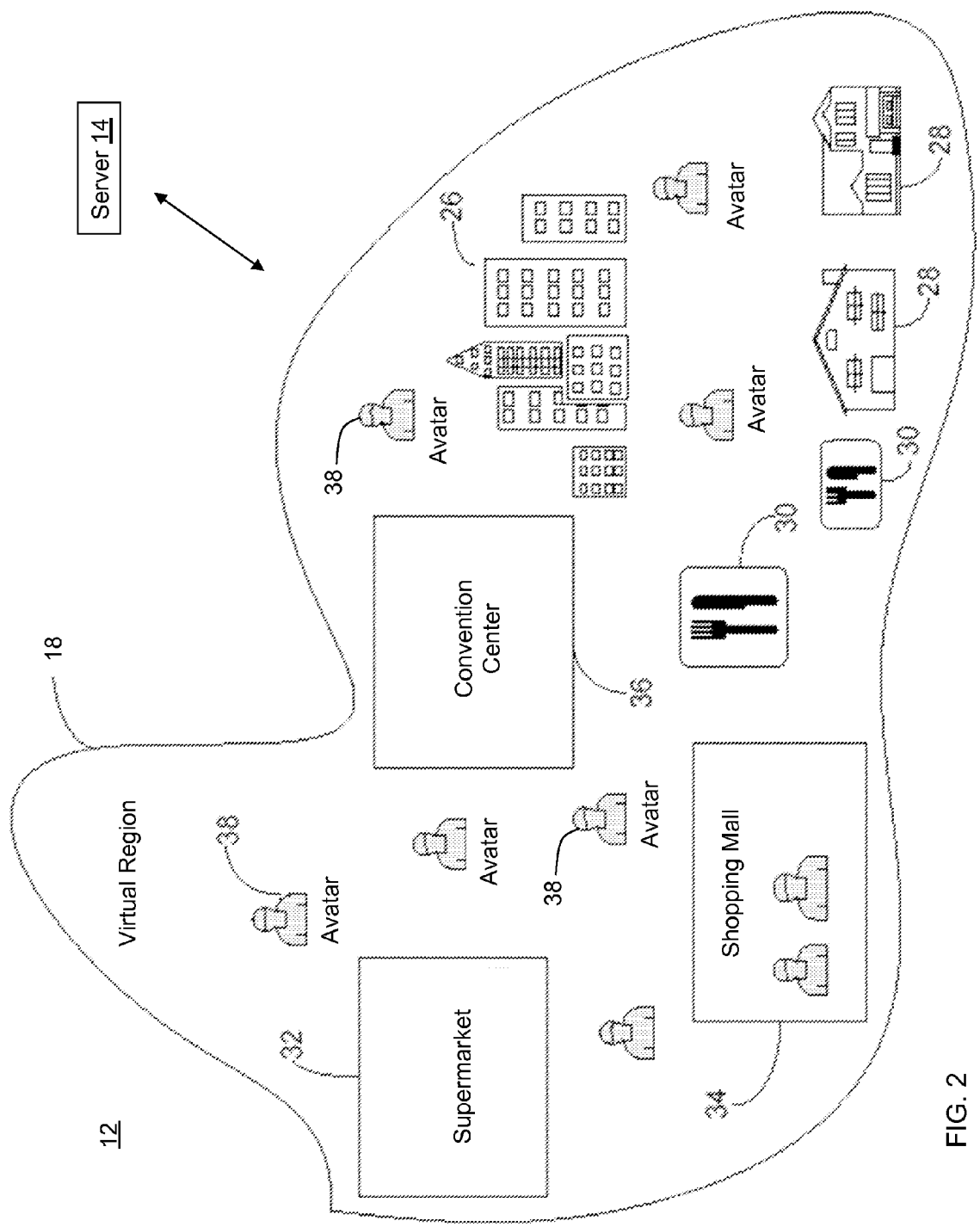
FIG. 2 shows a more detailed view of a virtual region shown in the virtual universe of FIG. 1.

FIG. 2 shows a more detailed view of what one virtual region 18 in VU 12 may comprise. As an example, virtual region 18 shown in FIG. 2 comprises a downtown office center 26, homes 28, restaurants 30, a supermarket 32 and a shopping mall 34 for shopping, and a convention center 36 for meetings and various conventions. Residents or avatars 38, which as mentioned above, are personas or representations of the users of the virtual universe, roam all about the virtual region by walking, driving, flying or even by teleportation or transportation, which is essentially moving through space from one point to another, more or less instantaneously. These examples of virtual content in virtual region 18 shown in FIG. 2 are only illustrative of some items that may be found in a virtual region and those skilled in the art will recognize that these regions can have more virtual content that can be found in the real world, as well as things that do not presently exist in the real world.

Figure 3:
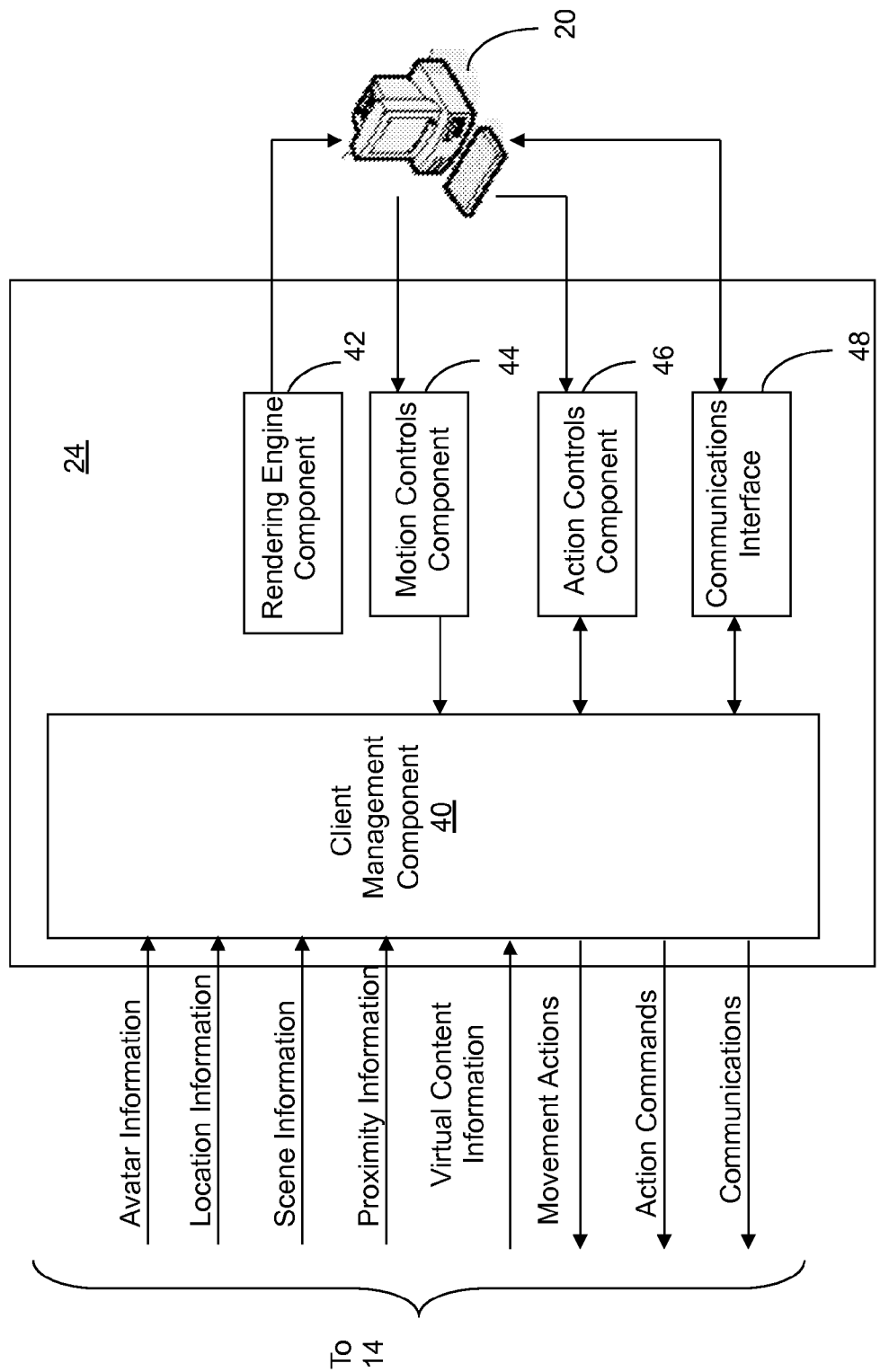
FIG. 3 shows a more detailed view of the virtual universe client shown in FIG. 1.

FIG. 3 shows a more detailed view of virtual universe client 24 shown in FIG. 1. Virtual universe client 24, which enables users to interact with VU 12, comprises a client management component 40, which manages actions, commands and communications made by a user through computer 20, and information received from the virtual universe through server 14. A rendering engine component 42 enables the user of computer 20 to visualize his or her avatar within the surroundings of the particular region of VU 12 that the avatar is presently located. As will be further described herein, rendering engine 42 receives an alternative representation of virtual content in VU 12 and renders it for display to the user of computer 20.

A motion controls component 44 enables the user's avatar (s) to make movements through the virtual universe. In one embodiment, movements through the virtual universe can include, for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of VU 12 through modalities such as chatting, instant messaging, gesturing, talking and electronic mail (e-mail).

FIG. 3 shows the various types of information received by client management component 40 from the virtual universe through server 14. In particular, client management component 40 receives avatar information about the avatars that are in proximity to the user's avatar. In addition, client management component 40 receives location information about the area that the user's avatar is near (e.g., what region or land the avatar is in), as well as scene information (e.g., what the avatar sees). Client management component 40 also receives proximity information, which contains information on what the user's avatar is near, and virtual content information, which is information about the objects, texts, and scripts of the virtual content renderable in the virtual universe. FIG. 3 also shows the movement commands and action commands that are generated by the user and sent to the server via client management component 40, as well as the communications that can be sent to the users of other avatars within the virtual universe.

Figure 4:
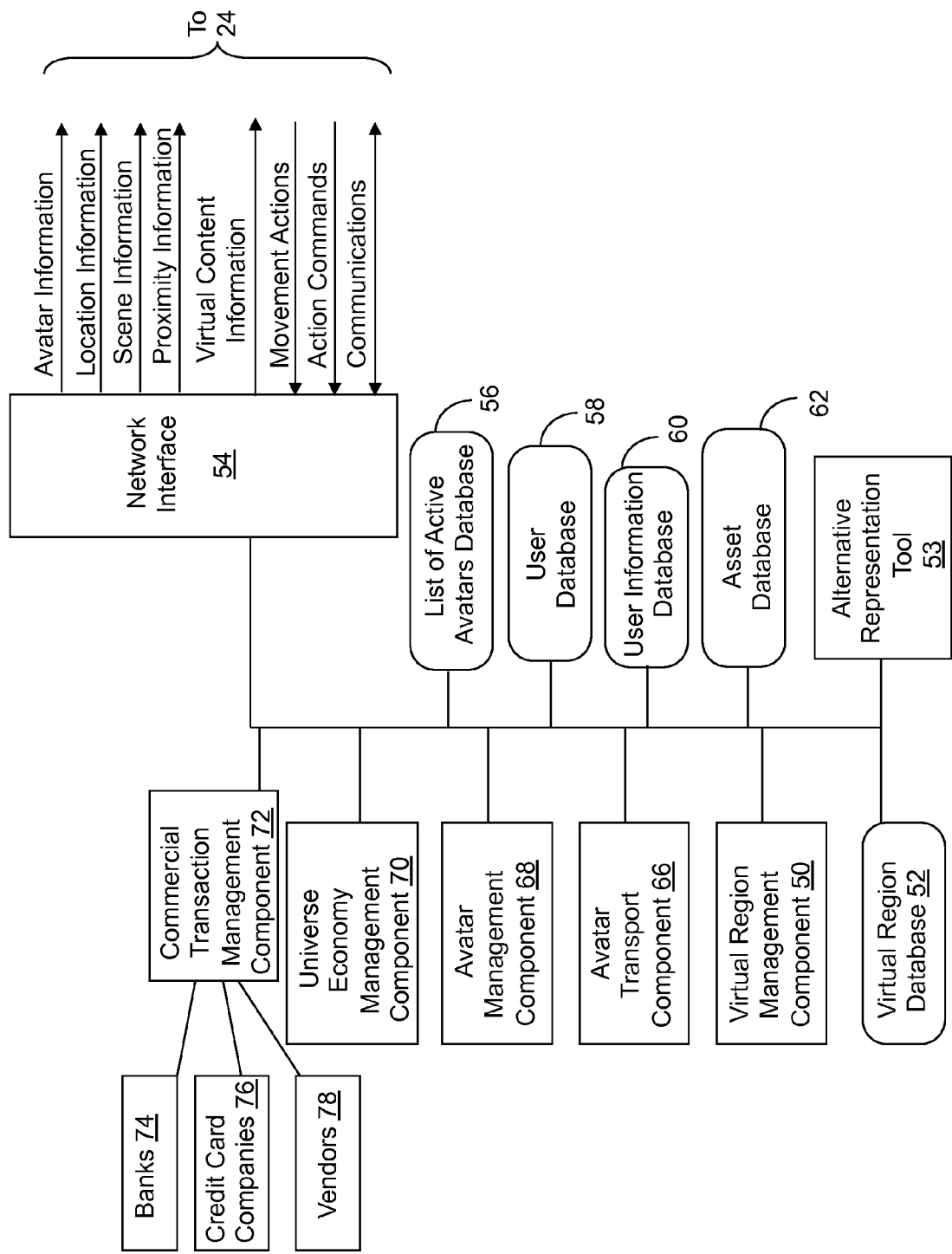
FIG. 4 shows a more detailed view of some of the functionalities provided by the server shown in FIG. 1.

FIG. 4 shows a more detailed view of some of the functionalities provided by server 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. Those skilled in the art will recognize that virtual region management component 50 can manage many other facets within the virtual region.

FIG. 4 shows a network interface 54 that enables server 14 to interact with virtual universe client 24 residing on computer 20. In particular, network interface 54 communicates avatar, location, scene, proximity, and virtual content information to the user through virtual universe client 24. The network interface receives movement and action commands, as well as communications from the user via virtual universe client 24.

FIG. 4 also shows an alternative representation tool 53, which provides the capability to provide alternative representations of virtual content renderable in the virtual universe. An illustrative but non-limiting listing of types of alternative representations of virtual content renderable in the virtual universe includes a simplified geometric representation of at least a portion of the virtual content renderable in the virtual universe, a simplified textural representation for at least a portion of the virtual content renderable in the virtual universe, or a modified media stream renderable in the virtual universe. In this embodiment, alternative representation tool 53 resides on the same computer system as virtual universe client 24. However, it can be appreciated that in other embodiments, alternative representation tool 53 may reside on server 14, or reside on separate computers in direct communication with the virtual universe server 14 and virtual universe clients 24.

As shown in FIG. 4, there are several different databases for storing information. In particular, virtual region database 52 stores information on all of the specifics in the virtual region that virtual region management component 50 is managing. Virtual region database 52 contains metadata information about the objects, texts and scripts associated with the virtual content in the virtual region(s) of VU 12. List of active avatars database 56 contains a list of all the avatars that are online in the VU 12, while user database 58 and information database 60 contain information on the actual human users of VU 12. In one embodiment, user database 58 contains general information on the users such as names, email addresses, locales, interests, ages, preferences, etc., while user information database 60 contains additional information on the users such as billing information (e.g., credit card information) for taking part in transactions. In an exemplary embodiment, user database 58 contains information about the priority of each of avatars 38 within region 18 of virtual universe 12. As will be further described below, avatar priority may be used to prioritize access to region 18 in cases of where avatar crowding and performance degradation are possible.

Asset database 62 contains information on the avatars of the users that reside in VU 12. In one embodiment, asset database 62 contains information on the virtual content within the personal inventories of each avatar of the virtual universe. An illustrative but non-limiting listing of the virtual content that can be present in asset database 62 includes avatar accessories (e.g., clothing), virtual pets, vehicles, electronic media (e.g., music files), graphics files, sound files, animations, electronic documents, video files, avatar body parts, avatar tools, calling cards, note cards, photos and photo albums, or any other type of virtual content.

Those skilled in the art will also recognize that databases 56-62 may contain additional information if desired. Databases 56-62 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, databases 56-62 might reside on the same computers as virtual universe client 24, have components that reside on both server 14 and virtual universe client 24, or reside on separate computers in direct communication with virtual universe server 14 and virtual universe client 24.

An avatar transport component 66 enables users to transport, which as mentioned above, allows avatars to transport through space from one point to another point, instantaneously. As a result, an avatar could for example travel from a business region to an entertainment region to experience a concert.

An avatar management component 68 logs what the avatars are doing while in the virtual universe. For example, avatar management component 68 can determine where each avatar is presently located in the virtual universe, as well as what activities it is performing or has recently performed. An illustrative but non-exhaustive list of activities can include shopping, eating, talking, recreating, etc.

Because a typical virtual universe has a vibrant economy, server 14 has functionalities that are configured to manage the economy. In particular, a universe economy management component 70 manages transactions that occur within the virtual universe between avatars. In one embodiment, VU 12 will have its own VU currency ($VU) that users pay for with real-life money. The users can then take part in commercial transactions for their avatars through universe economy management component 70. For example, a user might want to pay for a service that automatically reduces server load by providing alternative representations of virtual content within the virtual universe. In this case, the user (via his/her avatar) would make the purchase of this service using the $VU. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not an avatar. In order to fulfill this type of transaction and others similarly related, commercial transaction management component 72 interacts with banks 74, credit card companies 76 and vendors 78.

Figure 5:
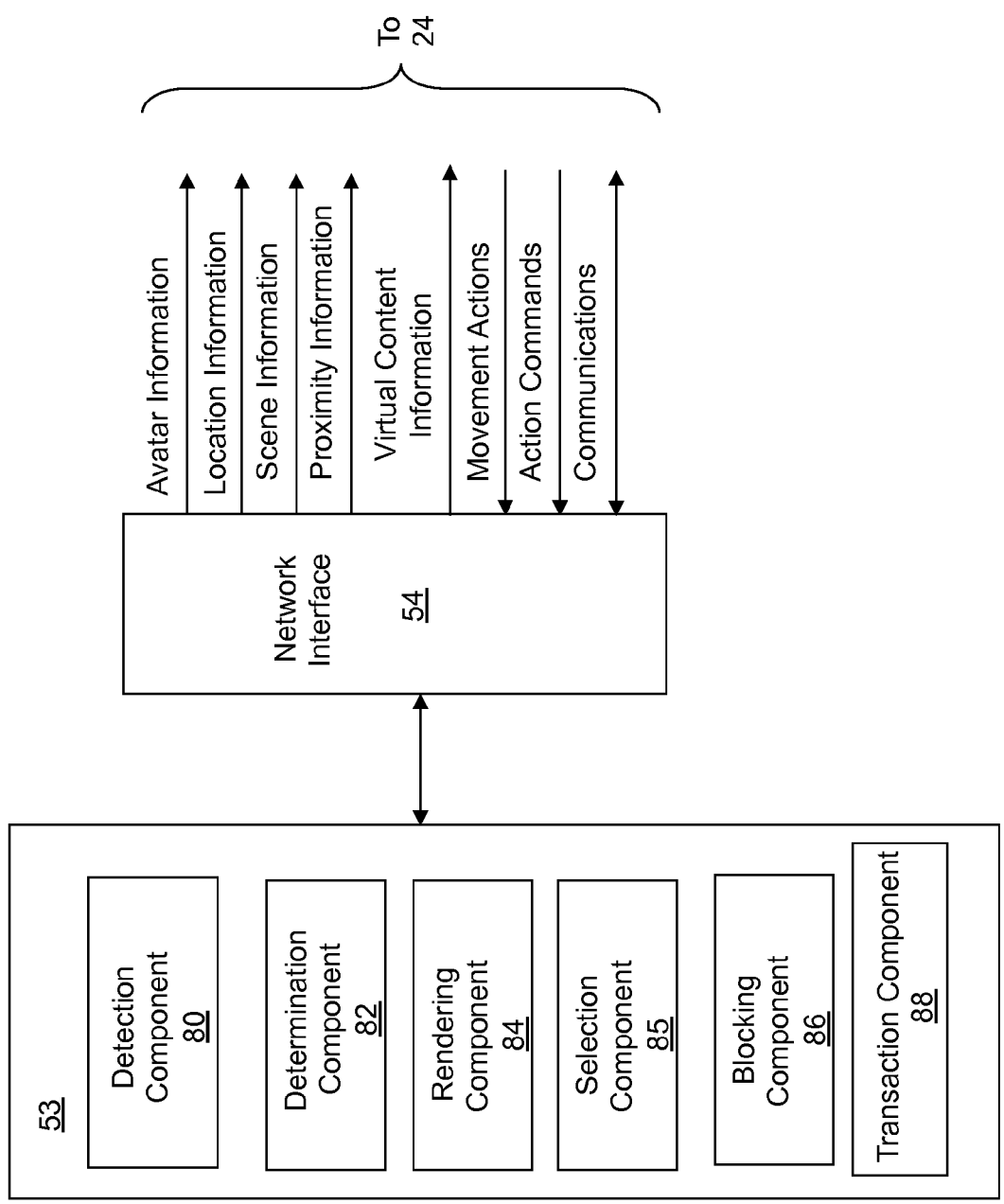
FIG. 5 shows an alternative representation tool according to one embodiment of this invention that operates in the environment shown in FIG. 1.

Referring now to FIGS. 1 and 5, alternative representation tool 53 according to embodiments of the invention will be described in further detail. As shown in FIG. 5, alternative representation tool 53 comprises a detection component 80 configured to detect a load on server 14. The load on server 14 is influenced by a multitude of factors existing within region 18 including, but not limited to: number of avatars, number and complexity of distinct textures and scripts within region 18, as well streaming audio and visual media. Further, as additional avatars enter region 18, server 14 is required to expend additional CPU cycles and memory, which creates load. Detection component 80 is used to measure and determine the current or predicted load on server 14, and functions with a determination component 82, which determines whether the load is presently causing, or likely to cause, an undesirable degradation in performance. Specifically, as shown in FIG. 5, alternative representation tool 53 comprises a determination component 82 configured to determine whether the load on server 14 exceeds a predefined threshold. In one embodiment, the predetermined threshold may be triggered if the CPU resources required for all users of computers 20A-20C exceeds the available recourses on server 14, thus causing degraded server performance. For example, degradation can be detected by determining the wall time (i.e., the actual time taken for certain server operations to complete), and comparing the elapsed wall time for those operations to previously measured baselines. If performance degrades below the predetermined threshold for a defined time period, a potential server overload condition is present.

Next, if the predetermined threshold is triggered, alternative representation tool 53 takes steps to self-heal server 14 to prevent failure in overload conditions. Specifically, as shown in FIG. 5, alternative representation tool 53 comprises a rendering component 84 configured to provide an alternative representation of the virtual content renderable in the virtual universe to reduce the load on server 14 in the case that the load on server 14 exceeds the predefined threshold. In one embodiment, to provide an alternative representation, rendering component 84 is configured to modify the definition of the virtual content renderable in the virtual universe. As mentioned above, the virtual content of VU 12 may be defined in terms of a virtual reality modeling language, wherein the definition of the virtual content comprises programming data necessary for executing the objects, texts, and scripts within virtual universe 12. Rendering component 84 is configured to automatically annotate the definition of the virtual content renderable in the virtual universe with metadata that identifies how to modify the virtual content renderable in the virtual universe. For example, when authoring the world, metadata is added to the definition that explicitly states how an object, or class of objects is to be displayed to the user.

Consider, for example, the virtual content rendered in a prior art virtual universe 89 depicted in FIG. 6. Each of objects 90, 91, 92 may be associated with one or more texts/scripts that affect rendering in some fashion during a session in the virtual universe. In this example, objects 90, 91, 92 are rendered with texts/scripts corresponding to coloring and visual lighting effects, such as the shadowing caused by the presence of a virtual sun 93. These effects influence the amount of memory required to store the textures/scripts, which in turn influences the amount of resources required to transmit the textures/scripts to the client.

To prevent a potential overload situation due to complex and resource demanding virtual content being rendered in the virtual universe, alternative representation tool 53 of the present invention may deny the request for certain textures/scripts. For example, virtual universe client 24 may attempt to interpolate the texts/scripts based on surrounding virtual content, or use modified, simplified texts/scripts available on virtual universe client 24. To accomplish this, as shown in FIG. 7, rendering component 84 enables a reduced load on server 14 by modifying the definition of the virtual content rendered in the virtual universe. Specifically, rendering component 84 annotates the definition of the texts/scripts associated with the virtual content with metadata that identifies how to eliminate or modify the visual lighting effects from objects 94, 95, and 96. The modified definition is sent to rendering engine 42 (FIG. 3) and rendered to the user of the virtual universe as depicted in FIG. 7.

Further, in the embodiment shown in FIG. 7, to reduce the potential load on server 14, rendering component 84 is configured to modify the geometric shape of the objects in the virtual universe. Specifically, rendering component 84 annotates the definition of the objects associated with the virtual content with metadata that identifies how to provide simplified geometric representations of the objects. For example, as shown in FIG. 6, object 92 (i.e., an avatar) is shown with certain geometric dimensions, coloring, and complexity. Rendering component 84 may change the shape of one or more of avatar 96 to decrease the complexity of each object, as well as the resources required for rendering avatar 96. For example, avatar 96 may be rendered with non-essential objects removed, such as arms, legs and items avatar 96 is wearing or carrying.

In one embodiment, users may tag items and/or parts of buildings and landscapes that may be removed during times of impending overload. To accomplish this, alternative representation tool 53 comprises a selection component 85 (FIG. 5) configured to pre-select objects within region 18 of virtual universe 12 that are to be eliminated in the case that the load on server 14 exceeds the predefined threshold. Selection component 85 allows users to provide input into the order in which items are removed during overload conditions. Therefore, as VU performance degrades, objects that are pre-selected may be eliminated or modified prior to other objects in the region. This pre-selection information may be stored as metadata associated with each object.

In yet another embodiment, one or more avatars may be denied access to a particular region of the VU if an overload condition is likely to result. Specifically, as shown in FIGS. 2 and 5, alternative rending tool 53 comprises a blocking component 86 configured to restrict access to region 18 of VU 12 in the case that the load on server 14 exceeds the predefined threshold, or is likely to exceed it in the future. In other embodiments, avatars could be selectively moved to a different region by blocking component 86 based on a number of metrics or removal rules including, but not limited to: random removal, removal based on the order of entrance into region 18 (e.g., first in, first out/last in, first out), or removal of avatars within region 18 who appear to be idle.

In another embodiment of this invention, alternative representation tool 53 is used as a service to charge fees for providing alternative representations of virtual content in the virtual world. As shown in FIG. 5, alternative representation tool 53 comprises a transaction component 88 configured to charge a fee for providing the alternative representation of virtual content renderable in the virtual universe. In this embodiment, the provider of the virtual universe or a third party service provider could offer this transaction as a service by performing the functionalities described herein on a subscription and/or fee basis. In this case, the provider of the virtual universe or the third party service provider can create, deploy, maintain, support, etc., alternative representation tool 53 that performs the processes described in the invention. In return, the virtual universe or the third party service provider can receive payment from the virtual universe residents via universe economy management component 70 and commercial transaction management component 72 (FIG. 4).

In still another embodiment, the methodologies disclosed herein can be used within a computer system to provide alternative representations of virtual content in the virtual world. In this case, alternative representation tool 53 can be provided, and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 8:
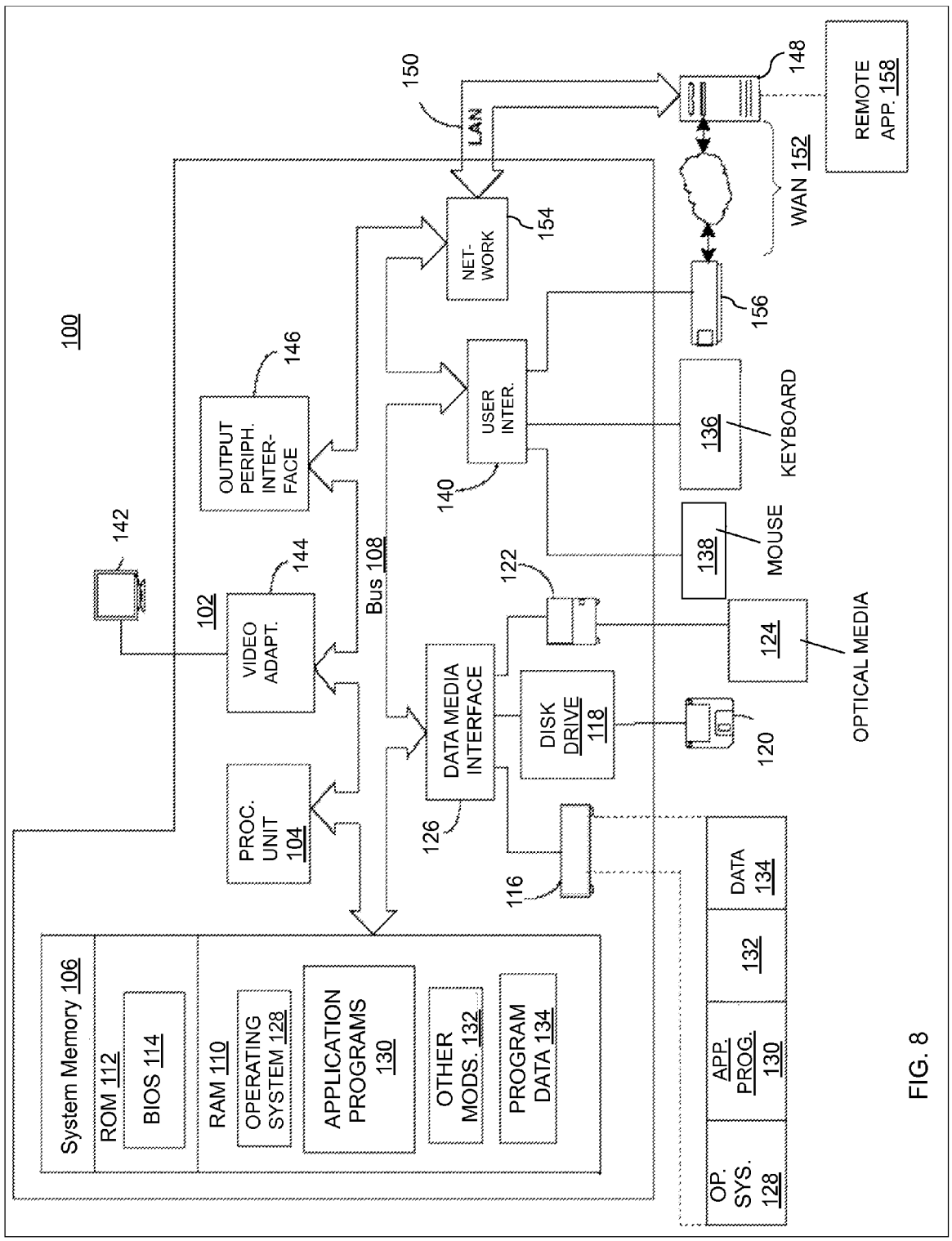
FIG. 8 shows a schematic of an exemplary computing environment in which elements of the networking environment shown in FIG. 1 may operate.

FIG. 8 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency or requirement relating to any one or combination of components illustrated in FIG. 8.

In the computing environment 100 there is a computer 102, which is operational with numerous other general purpose or special purpose computing system environments or configurations. Examples of well known computing systems, environments, and/or configurations that may be suitable for use with computer 102 of the present invention include, but are not limited to, personal computers, server computers, thin clients, thick clients, hand-held or laptop devices, cellular telephones, personal digital assistants (PDA), multiprocessor systems, microprocessor-based systems, set top boxes, programmable consumer electronics, network PCs, minicomputers, mainframe computers, distributed computing environments that include any of the above systems or devices, and the like.

Computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 8, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 8, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 8 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. Hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including server 14 and virtual universe client 24. In one embodiment, the one or more application programs 130 include components of alternative representation tool 53, such as visual component 80, rendering component 84, and transaction component 88.

Figure 9:
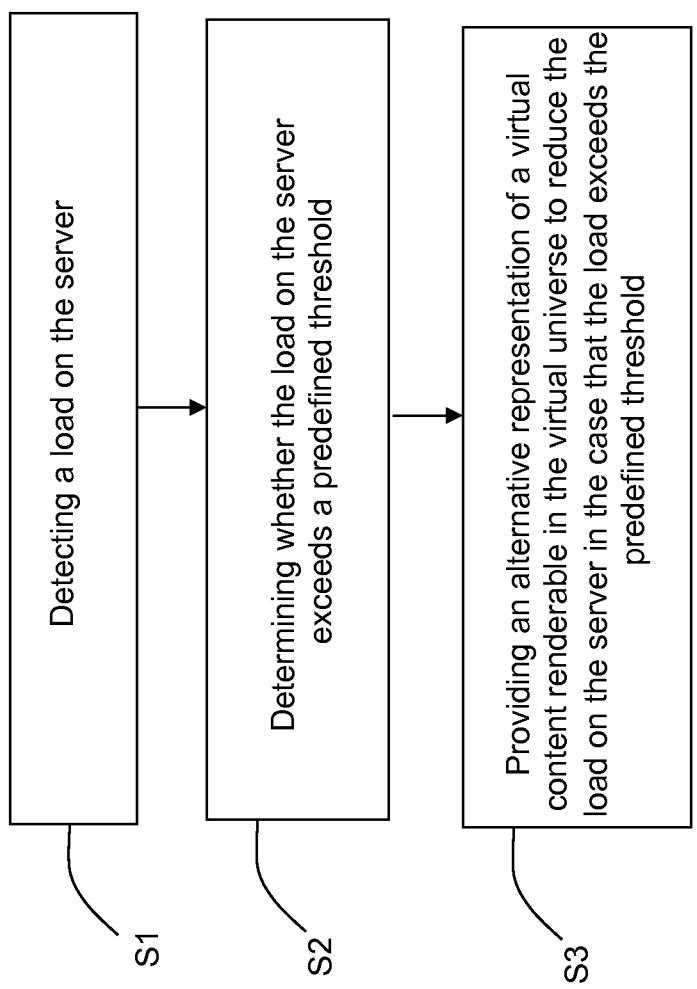
FIG. 9 shows a flow diagram of a method for providing an alternative representation of virtual content in a virtual universe according to embodiments of the invention.

The one or more program modules 130 carry out the methodologies disclosed herein, as shown in FIG. 9. According to one embodiment, in step S1, a load on the server is detected. In S2, it is determined whether the load on the server exceeds a predefined threshold. In S3, an alternative representation of a virtual content renderable in the virtual universe is provided to reduce the load on the server in the case that the load on the server exceeds the predefined threshold. The flowchart of FIG. 9 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 8, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 8 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to system bus 108 via the user input interface 140 or other appropriate mechanism.

In a networked environment, program modules depicted relative to the personal computer 102, or portions thereof, may be stored in a remote memory storage device. By way of example, and not limitation, FIG. 8 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing an alternative representation of virtual content in a virtual universe to automatically reduce the load on the server functioning with the virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for automatically reducing a load on a server functioning with a virtual universe, comprising:
   detecting a load on the server;
   determining whether the load on the server exceeds a predefined threshold; and
   annotating a definition of a virtual reality modeling language with metadata to automatically generate an alternative representation of a virtual content renderable in the virtual universe to reduce the load on the server in the case that the load on the server exceeds the predefined threshold, wherein the metadata further comprises priority information defining a modification order for the virtual content relative to other virtual content renderable in the virtual universe in the case that the load on the server exceeds the predefined threshold, and wherein the modification order is pre-selected by a user tagging objects within a region of the virtual universe that are to be eliminated.

2. The method according to claim 1, the alternative representation of the virtual content renderable in the virtual universe comprising at least one of the following a simplified textual representation of at least a portion of the virtual content renderable in the virtual universe, or a modified media stream renderable in the virtual universe.

3. The method according to claim 1 further comprising restricting access to a region of the virtual universe in the case that the load on the server exceeds the predefined threshold.

4. The method according to claim 3, the restricting comprising selectively moving avatars to a different region based on at least one of the following removal rules: random removal, removal based on the order of entrance into region, and removal of avatars within a region who appear to be idle.

5. The method according to claim 1, further comprising pre-selecting parts of objects within the region of the virtual universe that are to be eliminated in the case that the load on the server exceeds a predefined threshold.

6. The method according to claim 1 further comprising charging a fee for providing alternative representations of the virtual content renderable in the virtual universe.

7. A computer system for automatically reducing a load on a server functioning with a virtual universe, comprising:
   at least one processing unit;
   a computer readable memory operably associated with the at least one processing unit and a computer readable storage media;
   program instructions, stored on the computer readable storage media for execution by the at least one processing unit via the computer readable memory, to detect a load on the server;
   program instructions, stored on the computer readable storage media for execution by the at least one processing unit via the computer readable memory, to determine whether the load on the server exceeds a predefined threshold;
   program instructions, stored on the computer readable storage media for execution by the at least one processing unit via the computer readable memory, to annotate a definition of a virtual reality modeling language with metadata to automatically generate an alternative representation of a virtual content renderable in the virtual universe to reduce the load on the server in the case that the load on the server exceeds the predefined threshold, wherein the metadata further comprises priority information defining a modification order for the virtual content relative to other virtual content renderable in the virtual universe in the case that the load on the server exceeds the predefined threshold, and wherein the modification order is pre-selected by a user tagging objects within a region of the virtual universe that are to be eliminated.

8. The computer system according to claim 7, the alternative representation of the virtual content renderable in the virtual universe comprising at least one of the following: a simplified textual representation of at least a portion of the virtual content renderable in the virtual universe, or a modified media stream renderable in the virtual universe.

9. The computer system according to claim 7 further comprising program instructions, stored on the computer readable storage media for execution by the at least one processing unit via the computer readable memory, to restrict access to a region of the virtual universe in the case that the load on the server exceeds the predefined threshold.

10. The computer system according to claim 9, further comprising program instructions, stored on the computer readable storage media for execution by the at least one processing unit via the computer readable memory, to selectively move avatars to a different region based on at least one of the following removal rules: random removal, removal based on the order of entrance into region, and removal of avatars within a region who appear to be idle.

11. The computer system according to claim 7 further comprising program instructions, stored on the computer readable storage media for execution by the at least one processing unit via the computer readable memory, to pre-select parts of objects within the region of the virtual universe that are to be eliminated in the case that the load on the server exceeds a predefined threshold.

12. The computer system according to claim 7 further comprising program instructions, stored on the computer readable storage media for execution by the at least one processing unit via the computer readable memory, for charging a fee for providing alternative representations of the virtual content renderable in the virtual universe.

13. A computer-readable storage device storing computer instructions, which when executed, enables a computer system to automatically reduce a load on a server functioning with a virtual universe, the computer instructions comprising:
    detecting a load on the server;
    determining whether the load on the server exceeds a predefined threshold; and
    annotating a definition of a virtual reality modeling language with metadata to automatically generate an alternative representation of a virtual content renderable in the virtual universe to reduce the load on the server in the case that the load on the server exceeds the predefined threshold, wherein the metadata further comprises priority information defining a modification order for the virtual content relative to other virtual content renderable in the virtual universe in the case that the load on the server exceeds the predefined threshold, and wherein the modification order is pre-selected by a user tagging objects within a region of the virtual universe that are to be eliminated.

14. The computer-readable storage device according to claim 13, the alternative representation of the virtual content renderable in the virtual universe comprising at least one of the following: a simplified textual representation of at least a portion of the virtual content renderable in the virtual universe, or a modified media stream renderable in the virtual universe.

15. The computer-readable storage device according to claim 13, further comprising computer instructions for restricting access to a region of the virtual universe in the case that the load on the server exceeds a predefined threshold.

16. The computer readable storage device according to claim 15, the computer instructions for restricting comprising selectively moving avatars to a different region based on at least one of the following removal rules: random removal, removal based on the order of entrance into region, and removal of avatars within a region who appear to be idle.

17. The computer readable storage device according to claim 13 further comprising computer instructions for pre-selecting parts of objects within the region of the virtual universe that are to be eliminated in the case that the load on the server exceeds a predefined threshold.

18. The computer readable storage device according to claim 13 further comprising computer instructions for charging a fee for providing alternative representations of the virtual content renderable in the virtual universe.

19. A method for deploying an alternative representation tool for use in a computer system that automatically reduces a load on a server functioning with a region of a virtual universe, comprising:
    providing a computer infrastructure operable to:
        detect a load on the server;
        determine whether the load on the server exceeds a predefined threshold; and
        annotate a definition of a virtual reality modeling language with metadata to automatically generate an alternative representation of a virtual content renderable in the virtual universe to reduce the load on the server in the case that the load on the server exceeds the predefined threshold, wherein the metadata further comprises priority information defining a modification order for the virtual content relative to other virtual content renderable in the virtual universe in the case that the load on the server exceeds the predefined threshold, and wherein the modification order is pre-selected by a user tagging objects within a region of the virtual universe that are to be eliminated.

* * * * *